(12) United States Patent
Korenwaitz et al.

(10) Patent No.: US 9,805,280 B2
(45) Date of Patent: Oct. 31, 2017

(54) IMAGE ANALYSIS SYSTEMS AND METHODS

(71) Applicant: NETSPARK LTD., Petach Tikva (IL)

(72) Inventors: Elyasaf Korenwaitz, Elon More (IL); Haim Eaoshyhes, Elon More (IL)

(73) Assignee: NETSPARK LTD., Petach Tikvah (IL)

( * ) Notice: Subject to any disclaimer, the term of this patent is extended or adjusted under 35 U.S.C. 154(b) by 39 days.

(21) Appl. No.: 15/019,162

(22) Filed: Feb. 9, 2016

(65) Prior Publication Data

US 2016/0239718 A1 Aug. 18, 2016

Related U.S. Application Data

(60) Provisional application No. 62/116,598, filed on Feb. 16, 2015.

(51) Int. Cl.
*G06K 9/00* (2006.01)
*G06K 9/32* (2006.01)
*G06K 9/62* (2006.01)

(52) U.S. Cl.
CPC ....... *G06K 9/3241* (2013.01); *G06K 9/00234* (2013.01); *G06K 9/6257* (2013.01)

(58) Field of Classification Search
USPC .............. 382/103, 117, 118, 282; 235/462.1, 235/462.01, 462.14, 462.11, 462.25; 141/98, 364; 345/473, 687; 715/716, 715/749
See application file for complete search history.

(56) References Cited

U.S. PATENT DOCUMENTS

| | | | | |
|---|---|---|---|---|
| 6,732,929 B2* | 5/2004 | Good | ................. | G06K 7/10742 235/462.01 |
| 6,959,870 B2* | 11/2005 | Tsikos | .................... | B82Y 15/00 235/462.1 |
| 7,613,335 B2* | 11/2009 | McLennan | ........... | G06K 9/4652 382/128 |
| 8,135,184 B2* | 3/2012 | Steinberg | ............. | G06K 9/0061 382/103 |
| 2002/0136454 A1 | 9/2002 | Park | | |
| 2012/0141017 A1 | 6/2012 | Krupka | | |
| 2013/0238638 A1 | 9/2013 | Doron | | |
| 2014/0095515 A1 | 4/2014 | Korenwaitz | | |

OTHER PUBLICATIONS

Lietz et al. "Improving pedestrian detection using MPEG-7 descriptors" (Adv. Rad. Sci. (2013) 11:101-105).
Viola and Jones "Robust Real-Time Face Detection" International Journal of Computer Vision 57(2), 137-154, 2004.

(Continued)

*Primary Examiner* — Anh H Do
(74) *Attorney, Agent, or Firm* — IPAttitude Ltd.

(57) ABSTRACT

A system including: (a) a network hub or port adapted to detect image files in transit according to their file designations; (b) an object detector configured to identify one or more regions of interest (ROI) in each image file as potentially containing an object of interest (OOI); (c) a feature analyzer adapted to express one or more General Classification Features (GCF) of each ROI as a vector; and (d) a decision module adapted accept or reject each ROI as containing said OOI based upon the one or more GCF vectors.

11 Claims, 8 Drawing Sheets

Fig. 1

(56) References Cited

OTHER PUBLICATIONS

Viola and Jones "Rapid Object Detection using a Boosted Cascade of Simple Features" Conference on Computer Vision and Pattern Recognition 2001.
Wikipedia "Viola-Jones object detection framework".
Ojala et al. (1996) "A comparative study of texture measures with classification based on featured distributions" Pattern recognition 29.1: 51-59.
Liao et al. (2007) "Learning Multi-scale Block Local Binary Patterns for Face Recognition" International Conference on Biometrics (ICB) pp. 828-837).
Zemčík et al. (2007) "Local Rank Differences—Novel Features for Image" P Zemčík, M Hradiš, A Herout Poster SCCG 2007.
Hradis et al. (2008) "Local Rank Patterns—Novel Features for Rapid Object Detection" ICCVG 2008: 239-248.
Dalal et al. (2005) "Histograms of oriented gradients for human detection"Computer Vision and Pattern Recognition, CVPR 2005. IEEE Computer Society Conference on. vol. 1. IEEE.
Yang et al. (1998) "Detecting human faces in color images" Image Processing, ICIP 98. Proceedings. 1998 International Conference on. vol. 1. IEEE.
Sandeep et al. (2002) "Human Face Detection in Cluttered Color Images Using Skin Color, Edge Information" ICVGIP. 2002.

\* cited by examiner

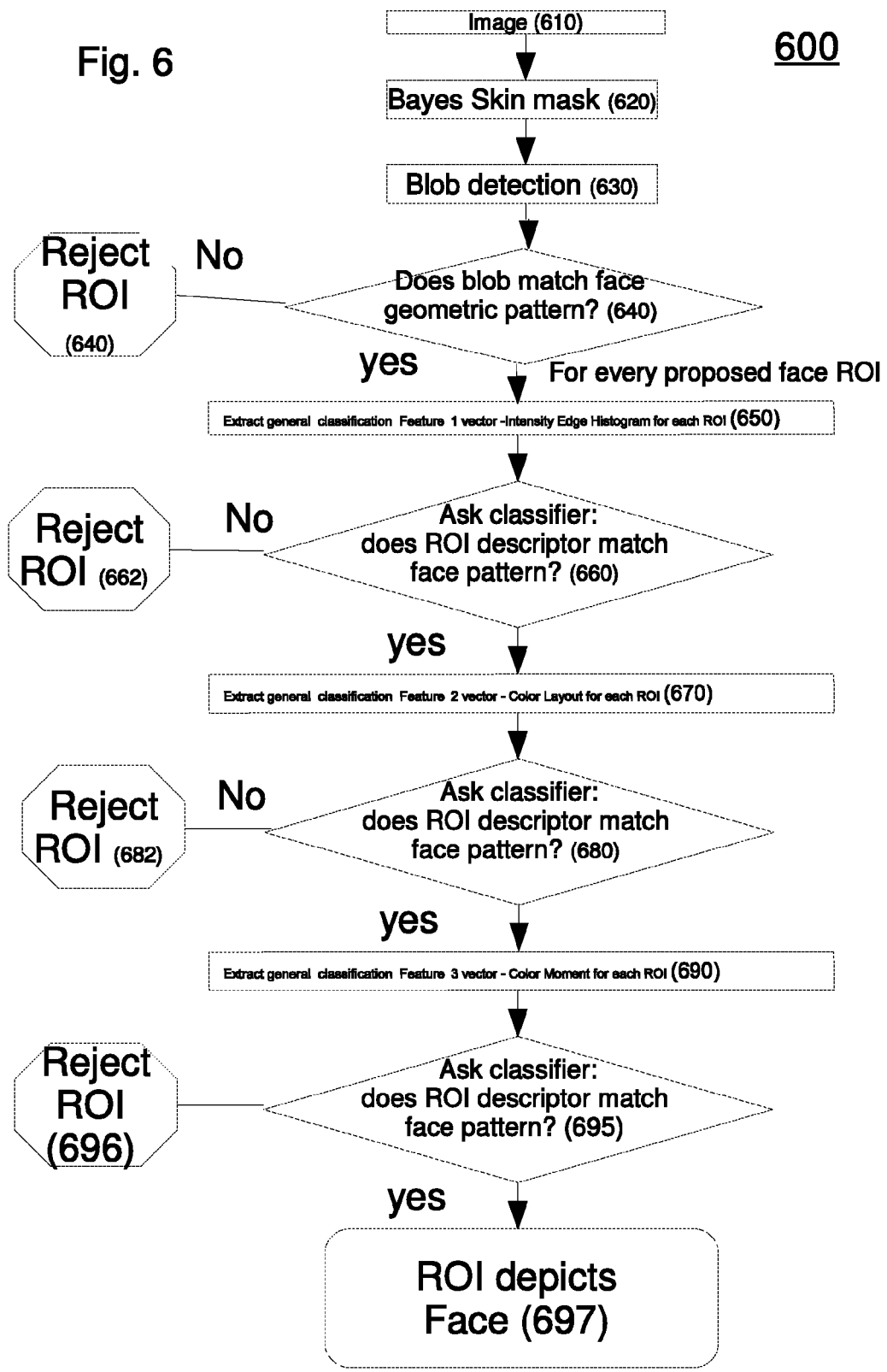

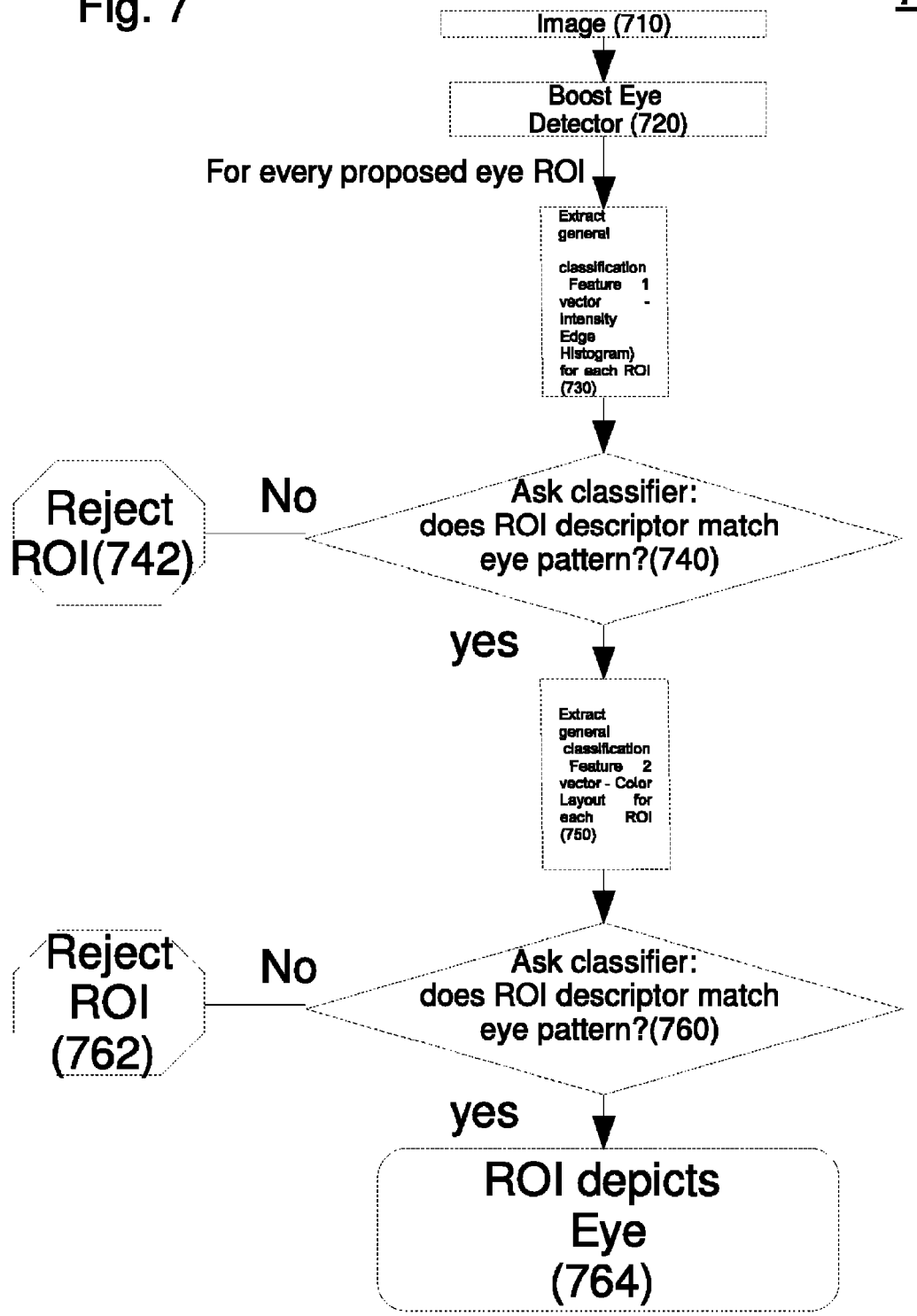

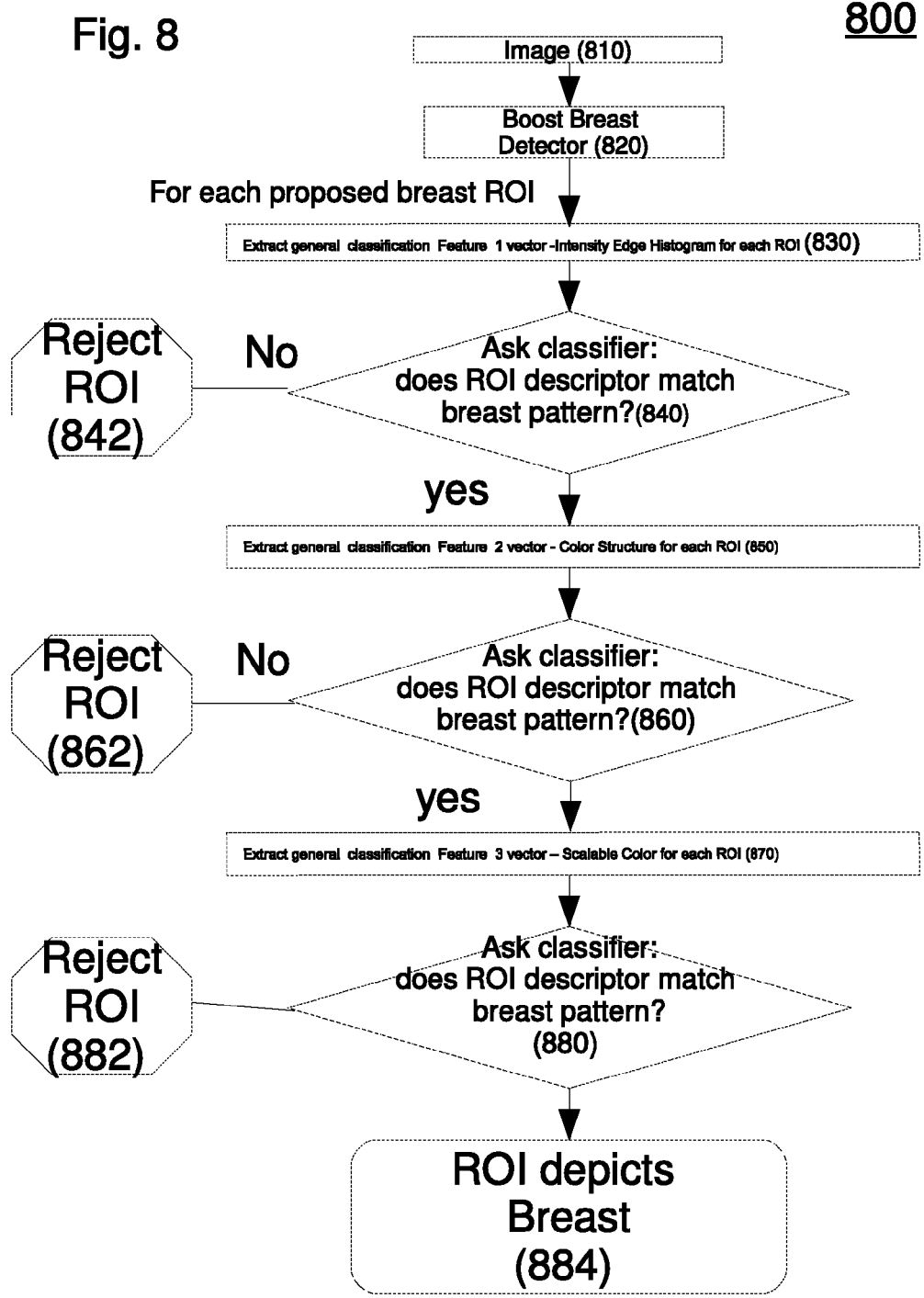

IMAGE ANALYSIS SYSTEMS AND METHODS

RELATED APPLICATIONS

This application claims the benefit according to 35 U.S.C. §119(e) of provisional patent application U.S. 62/116,598 filed Feb. 16, 2015 and having the same title and inventors as the present application.

FIELD OF THE INVENTION

The invention is in the field of automated image analysis.

BACKGROUND OF THE INVENTION

US 2013/0238638 by Doron et al. describes a system and method which identify structures within a presentation and detect undesired content in those structures. A decision is made whether to remove portions of the presentation containing the undesired content or the entire presentation, based on determining the domination of the undesired content within the structures of the presentation.

US 2012/0141017 by Krupka et al. describes training set for a post-filter classifier is created from the output of a face detector. The face detector can be a Viola Jones face detector. Face detectors produce false positives and true positives. The regions in the training set are labeled so that false positives are labeled negative and true positives are labeled positive. The labeled training set is used to train a post-filter classifier. The post-filter classifier can be an SVM (Support Vector Machine). The trained face detection classifier is placed at the end of a face detection pipeline comprising a face detector, one or more feature extractors and the trained post-filter classifier. The post-filter reduces the number of false positives in the face detector output while keeping the number of true positives almost unchanged using face detection features different from the Haar features used by the face detector.

Lietz et al. (Adv. Rad. Sci. (2013) 11:101-105) describes pedestrian detection systems which use video scenes as an input.

SUMMARY OF THE INVENTION

A broad aspect of the invention relates to automated detection of certain classes of objects within a graphic image file. According to various exemplary embodiments of the invention the class of object identified is a face, a portion of a face (e.g. an eye) or a non-face body part (e.g. an exposed breast or portion thereof).

One aspect of some embodiments of the invention relates to increasing the percentage of approved objects which are actually the desired object in an approved result set.

Another aspect of some embodiments of the invention relates to decreasing the percentage of rejected objects which are actually the desired object in a rejected result set.

In some exemplary embodiments of the invention, an initial screening is conducted using one or more Boosted Cascade classifier algorithms selected from the group consisting of Haar, LBP, LRD, LRP, HOG textural features, and SkinBlob Detection or every other possible detection feature different from GCF used for post filtering. According to various exemplary embodiments of the invention one or more additional General Classification Features (GCF) are used to improve the accuracy of the initial screening. According to various exemplary embodiments of the invention the GCFs include one or more of color moment, Gabor function, color histogram, skin blob geometric information, color layout, intensity edge histogram, 3 colors plane edge histogram, color structure and scalable color. In some embodiments, each GCF is expressed as a vector with a natural number value of 1 or 2 representing two class discrimination system and two probability variables between 0 and 1. In some embodiments, a global probability vector is used to summarize 2, 3, 4, 5, 6, 7, 8 or more GCFs. Alternatively or additionally, in some embodiments a formula is used to summarize 2, 3, 4, 5, 6, 7, 8 or more GCFs and/or the global probability vector.

It will be appreciated that the various aspects described above relate to solution of technical problems associated with increasing the reliability of automated image analysis.

Alternatively or additionally, it will be appreciated that the various aspects described above solve technical problems associated with automated screening of content to eliminate undesirable content. In some embodiments, the percentage of false positive results is lowered to 5%, 2.5%, 1%, 0.76% or lesser or intermediate percentages while the rate of true positive results is maintained above 90%, 95%, 97% or 99% or intermediate or greater percentages.

Alternatively or additionally, it will be appreciated that the various aspects described above solve technical problems associated with increasing accuracy of automated screening while leaving latency time substantially unchanged.

In some exemplary embodiments of the invention there is provided a system including: (a) a network hub or port adapted to detect image files in transit according to their file designations; (b) an object detector configured to identify one or more regions of interest (ROI) in each image file as potentially containing an object of interest (OOI); (c) a feature analyzer adapted to express one or more General Classification Features (GCF) of each ROI as a vector; and (d) a decision module adapted accept or reject each ROI as containing the OOI based upon the one or more GCF vectors. In some embodiments, the object detector employs one or more Boosted Classifier algorithms (e.g. WaldBoost, LogitBoost, AdaBoost-Gentle AdaBoost, Discrete AdaBoost and Real AdaBoost) ith at least one textural feature selected from the group consisting of Haar, LBP, LRD, LRP, HOG. Alternatively or additionally, in some embodiments the GCFs include one or more of Gabor function, skin blob geometric and color information, intensity edge histogram, 3 colors plane edge histogram, color information such as color histogram, color layout, color moment, color structure and scalable color. Alternatively or additionally, in some embodiments each GCF is expressed as a vector with a natural number value of 1 or 2 representing two class discrimination system and two probability variables between 0 and 1. Alternatively or additionally, in some embodiments a global probability vector is used to combine two or more GCFs response vectors. Alternatively or additionally, in some embodiments a formula is used to summarize two or more GCFs and/or the global probability vector. Alternatively or additionally, in some embodiments the feature analyzer employs intensity edge histogram and color layout sequentially to identify objects. Alternatively or additionally, in some embodiments the objects are selected from the group consisting of faces and eyes. Alternatively or additionally, in some embodiments the feature analyzer employs intensity edge histogram, color structure and scalable color sequentially to identify breasts as objects. Alternatively or additionally, in some embodiments the object detector employs Skin Mask and Blob Detection to determine ROIs and geometrical information filter. Alternatively or additionally, in some embodiments the feature analyzer employs intensity edge histogram, Color Layout and Color Moment sequentially to identify faces as objects.

In some exemplary embodiments of the invention there is provided a method including: (a) scanning a plurality of images with an object detector to identify one or more regions of interest (ROI) in image file as potentially containing an object of interest (OOI); (b) manually reviewing each ROI to determine true positives (TP) which actually contain the OOI and false positives (FP) which do not contain the OOI; (c) analyzing each ROI with respect to one or more General Classification Features (GCF) and expressing each GCF of each ROI as a vector; and (d) determining a range of vector values for each GCF indicative of TP ROI which retains 95.8% of ROIs identified by an object detector and retains only 5.8% of ROIs which should have been rejected. In some embodiments, the scanning employs at least one algorithm selected from the group consisting of Haar, LBP, LRD, LRP, HOG, Blob Detection applied on Skin Mask. Alternatively or additionally, in some embodiments the GCFs include one or more of Gabor function, skin blob geometric and color information, intensity edge histogram, 3 colors plane edge histogram, color information such as color histogram, color layout, color moment, color structure and scalable color. Alternatively or additionally, in some embodiments each vector contain natural number value of 1 or 2 representing two class discrimination system and two probability variables between 0 and 1. Alternatively or additionally, in some embodiments the method includes calculating a global probability vector which combine two or more GCFs response probability values. Alternatively or additionally, in some embodiments the scanning employs Blob Detection applied on Skin Mask and geometrical information filter to determine ROIs.

In some exemplary embodiments of the invention there is provided a method including:
(a) identifying a region of interest (ROI) in a blue/green/red (BGR) image; (b) transforming BGR data in the ROI to hue-saturation-value (HSV) or another separative color space (e.g. HSL, XYZ, LUV, LAB); and (c) generating edge histogram vectors from at least one of the H, S and V channels. In some embodiments, the method includes generating edge histogram vectors from at least two of the H, S and V channels. Alternatively or additionally, in some embodiments the method includes generating edge histogram vectors from each of the H, S and V channels. Alternatively or additionally, in some embodiments the method includes combining the edge histogram vectors from two or more channels to produce a single vector.

In some exemplary embodiments of the invention there is provided a method including: (a) detecting image files in a response to an HTTP request; (b) identifying one or more regions of interest (ROI) in each image file as potentially containing an object of interest (OOI) to be screened; (c) analyzing one or more General Classification Features (GCF) of each ROI and expressing the result as a vector; and (d) deciding whether each ROI contain the OOI to be screened based upon the one or more GCF vectors; wherein the additional latency from analyzing is less than 5 milliseconds. Alternatively or additionally, in some embodiments the OOI to be screened is naked breast. Alternatively or additionally, in some embodiments the identification system is Boost Breast detector. Alternatively or additionally, in some embodiments the feature analyzer employs intensity edge histogram, color structure and scalable color sequentially to identify breasts as objects. Alternatively or additionally, in some embodiments the method includes masking any ROI containing the OOI to be screened in the response to the HTTP request. Alternatively or additionally, in some embodiments the method includes blocking transmission of any response includes an image file containing an ROI containing the OOI to be screened from.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Implementation of the method and system according to embodiments of the invention involves performing or completing selected tasks or steps manually, automatically, or a combination thereof. Moreover, according to actual instrumentation and equipment of exemplary embodiments of methods, apparatus and systems of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 6 is another simplified flow diagram illustrating face detection according to some exemplary embodiments of the invention;

FIG. 7 is a simplified flow diagram illustrating eye detection according to some exemplary embodiments of the invention; and FIG. 8 is a simplified flow diagram illustrating breast detection according to some exemplary embodiments of the invention.

DETAILED DESCRIPTION OF EMBODIMENTS

Embodiments of the invention relate to systems and methods for automated image analysis. Specifically, some embodiments of the invention can be used to identify specific objects (e.g. a face, an eye or a breast) within an image.

The principles and operation of a system and/or method according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Figure 1:
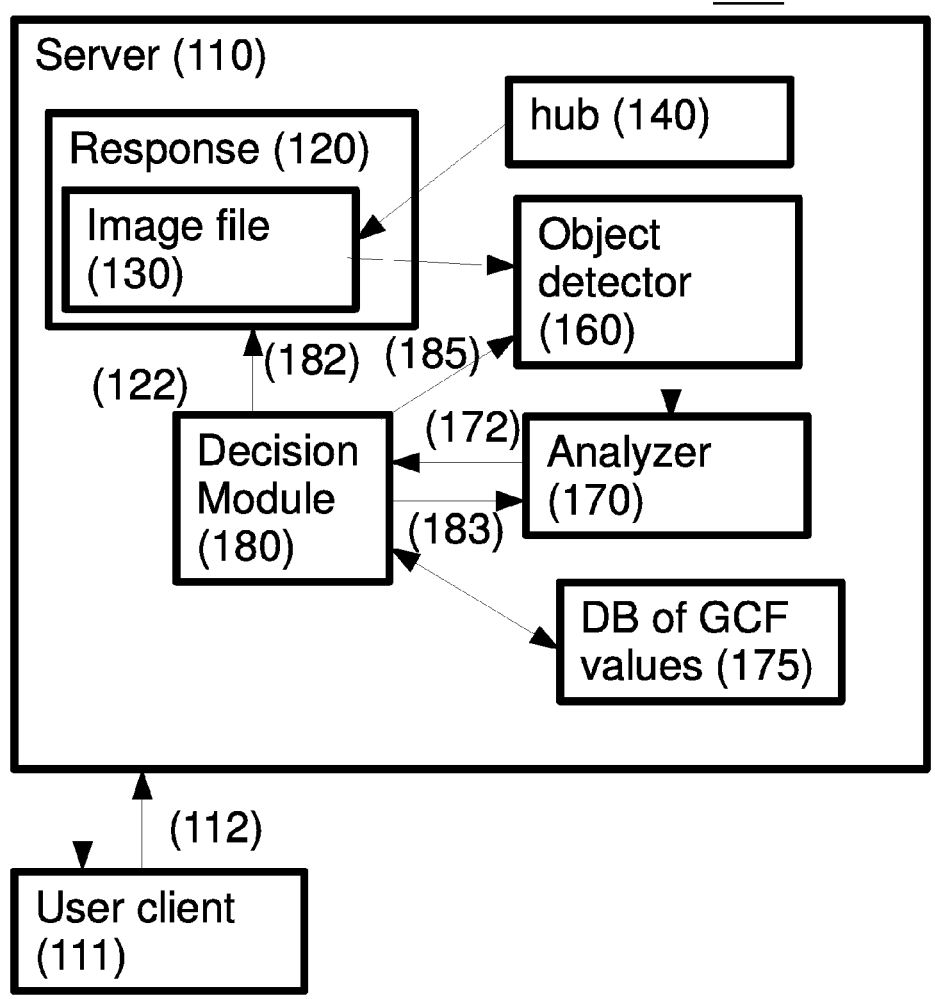
FIG. 1 is a schematic representation of a system according to some exemplary embodiments of the invention.

System Overview FIG. 1

FIG. 1 is a schematic representation of a system, indicated generally as 100 according to some exemplary embodiments of the invention. Depicted exemplary system 100 provides an exemplary context for various methods described herein below.

Depicted exemplary system 100 includes a server 110 and plurality of user client devices 111 (a single user client 111 is depicted although a large number are typically present).

User client 111 sends queries 112 to server 110. In some embodiments, queries 112 are coded in an internet protocol such as HTTP. Server 110 either prepares or receives a response 120. Hub 140 ascertains whether response 120 contains one or more image files 130. If image files 130 are present, they are analyzed by object detector 160 which identifies regions of interest (ROI) that may contain objects of interest (OOI). Each ROI is further analyzed by analyzer 170 to extract one or more general classification features (GCF) 172. Decision module 180 compares GCF data 172 with a database 175 of GCF values which are informative for the relevant object type and makes a decision 182 about image file 130 based upon the OOI it contains. A screened response 122 is then relayed to user client 111. Depending upon the nature of decision 182, screened response 122 relays an image file 130 unchanged, relay an image file 130 with a mask over undesired objects or omit an entire image file 130 from screened response 122.

Alternatively or additionally, in some embodiments decision module 180 supplies a model 183 to analyzer 170. According to these embodiments model 183 instructs analyzer 170 which GCF 172 to extract from ROI identified by object detector 160.

Alternatively or additionally, in some embodiments decision module 180 supplies detection instructions 185 to object detector 160. According to these embodiments instructions 185 define how detector 160 identifies ROI believed to contain OOI.

In some embodiments, id feature analyzer 350 employs intensity edge histogram, Color Layout and Color Moment sequentially to identify faces as objects.

Exemplary Classifier Training Method

Figure 2:
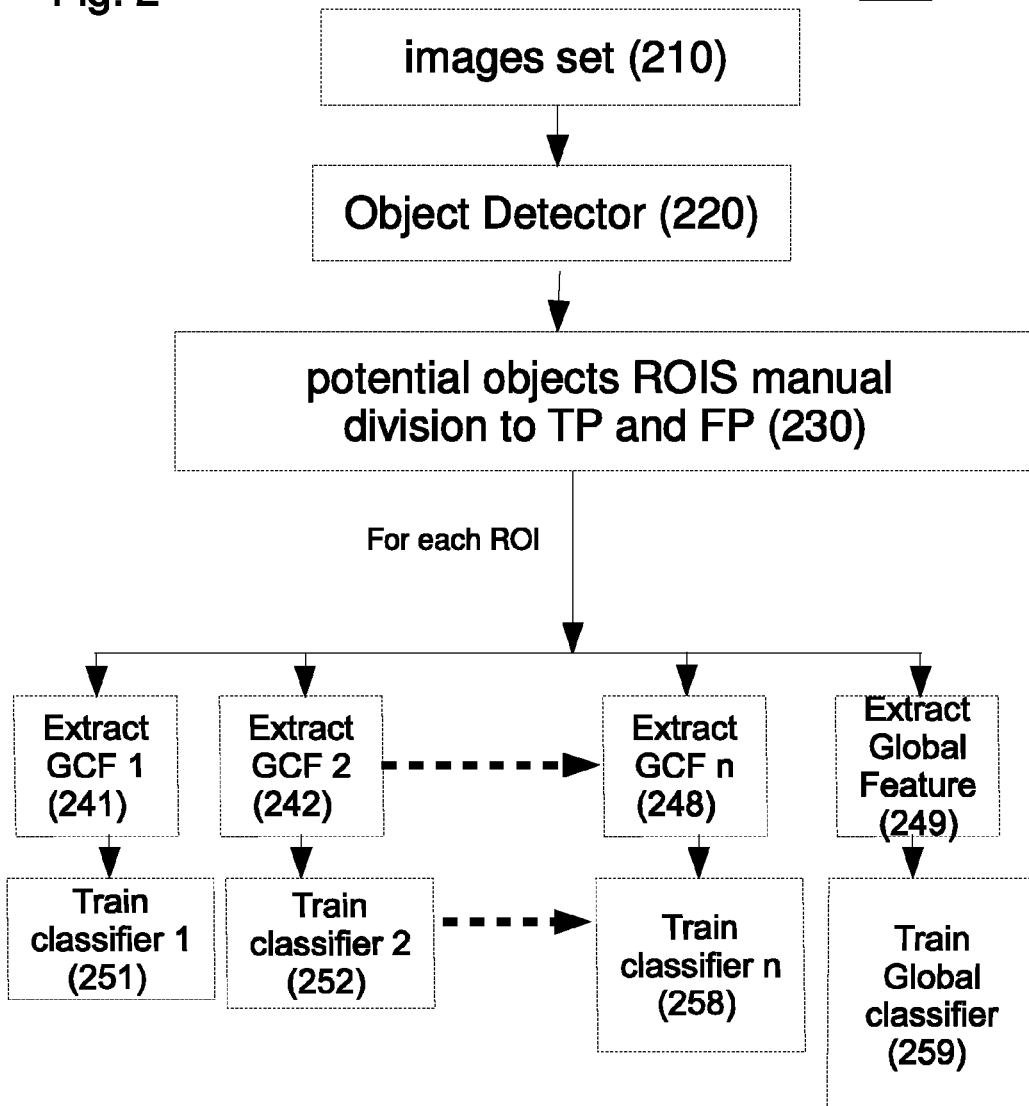
FIG. 2 is a simplified flow diagram illustrating assignment of classifier values to multiple General Classification Features (GCF) according to some exemplary embodiments of the invention.

FIG. 2 is a simplified flow diagram indicated generally as 200 illustrating assignment of classifier values to multiple General Classification Features (GCF) according to some exemplary embodiments of the invention. Practice of method 200 generates GCF values to populate DB 175 in FIG. 1 as described hereinabove.

Depicted Exemplary method 200 includes scanning a plurality of images 210 with an object detector 220 to identify one or more regions of interest (ROI) in image file as potentially containing an object of interest (OOI) and manually reviewing 230 each ROI to determine true positives (TP) which actually contain the OOI and false positives (FP) which do not contain the OOI. Depicted exemplary method 200 continues by analyzing each ROI with respect to one or more General Classification Features (GCF) and expressing each GCF of each ROI as a vector. This is depicted as extract GCF 1 to GCFN (241-248 respectively). In some embodiments, method 200 includes extraction of a global feature 249 which summarizes two or more GCFs probability values for current ROI, received from already trained GCF classifiers.

Finally, depicted exemplary method 200 includes determining a range of vector values for each GCF indicative of TP ROI (and FP ROI). This is depicted as train classifiers 1 to N (251-258 respectively). In those embodiments employing a global classifier 249, the global classifier is also trained 259 to generate a global probability vector. Values generated by this training are used to populate DB 175 in FIG. 1.

In some exemplary embodiments of the invention, the range of vector values for each GCF indicative of TP ROI retains 90% of ROIs identified by an object detector and retains only 10% of ROIs which should have been rejected.

In some exemplary embodiments of the invention, the range of vector values for each GCF indicative of TP ROI retains 93% of ROIs identified by an object detector and retains only 5% of ROIs which should have been rejected.

According to various exemplary embodiments of the invention the range is determined, and subsequently used by Neural Network (NN) or Support Vector Machine (SVM).

For example if detector 220 recognized 120 ROIS at 20 and 100 of them are true positive (TP) and 20 are false positives (FP) applying the ranges of values for the various GCFs trained at 251 and/or 252 and/or 258 and/or 259 93 of the TP ROIS are retained while only 1 FP ROI is retained.

According to various exemplary embodiments of the invention the scanning employs Boost Cascade classifiers using Haar (Viola et al. (2001) *Rapid object detection using a boosted cascade of simple features* Computer Vision and Pattern Recognition, CVPR 2005. Proceedings of the 2001 IEEE Computer Society Conference on. Vol. 1. IEEE) and/or LBP (Ojala et al. (1996) *A comparative study of texture measures with classification based on featured distributions* Pattern recognition 29.1: 51-59 and Liao et al. (2007) *Learning Multi-scale Block Local Binary Patterns for Face Recognition* International Conference on Biometrics (ICB) pp. 828-837) and/or LRD (Zemčik et al. (2007) *Local Rank Differences-Novel Features for Image*—P Zemčik, M Hradiš, A Herout Poster SCCG 2007), and/or LRP (Hradis et al. (2008) *Local Rank Patterns-Novel Features for Rapid Object Detection.* ICCVG 2008: 239-248) and/or HOG (Dalai et al. (2005) *Histograms of oriented gradients for human detection.* Computer Vision and Pattern Recognition, CVPR 2005. IEEE Computer Society Conference on. Vol. 1. IEEE, 2005).

Alternatively or additionally, according to various exemplary embodiments of the invention the GCFs include one or more of color moment, Gabor function, color histogram, skin blob geometric and color information (e.g. color histogram), color layout, intensity edge histogram, 3 colors plane edge histogram, color structure and scalable color.

Alternatively or additionally, in some embodiments each vector contains a natural number value of 1 or 2 representing two class discrimination system and two probability variables between 0 and 1.

In some embodiments, scanning by object detector 220 employs Blob Detection applied on Skin Mask and geometrical information filter to determine ROIs. (Yang et al. (1998) *Detecting human faces in color images* Image Processing, ICIP 98. Proceedings. 1998 International Conference on. Vol. 1. IEEE and Sandeep et al. (2002) *Human Face Detection in Cluttered Color Images Using Skin Color, Edge Information* ICVGIP. 2002).

Exemplary Automatic Image Detection System

Figure 3:
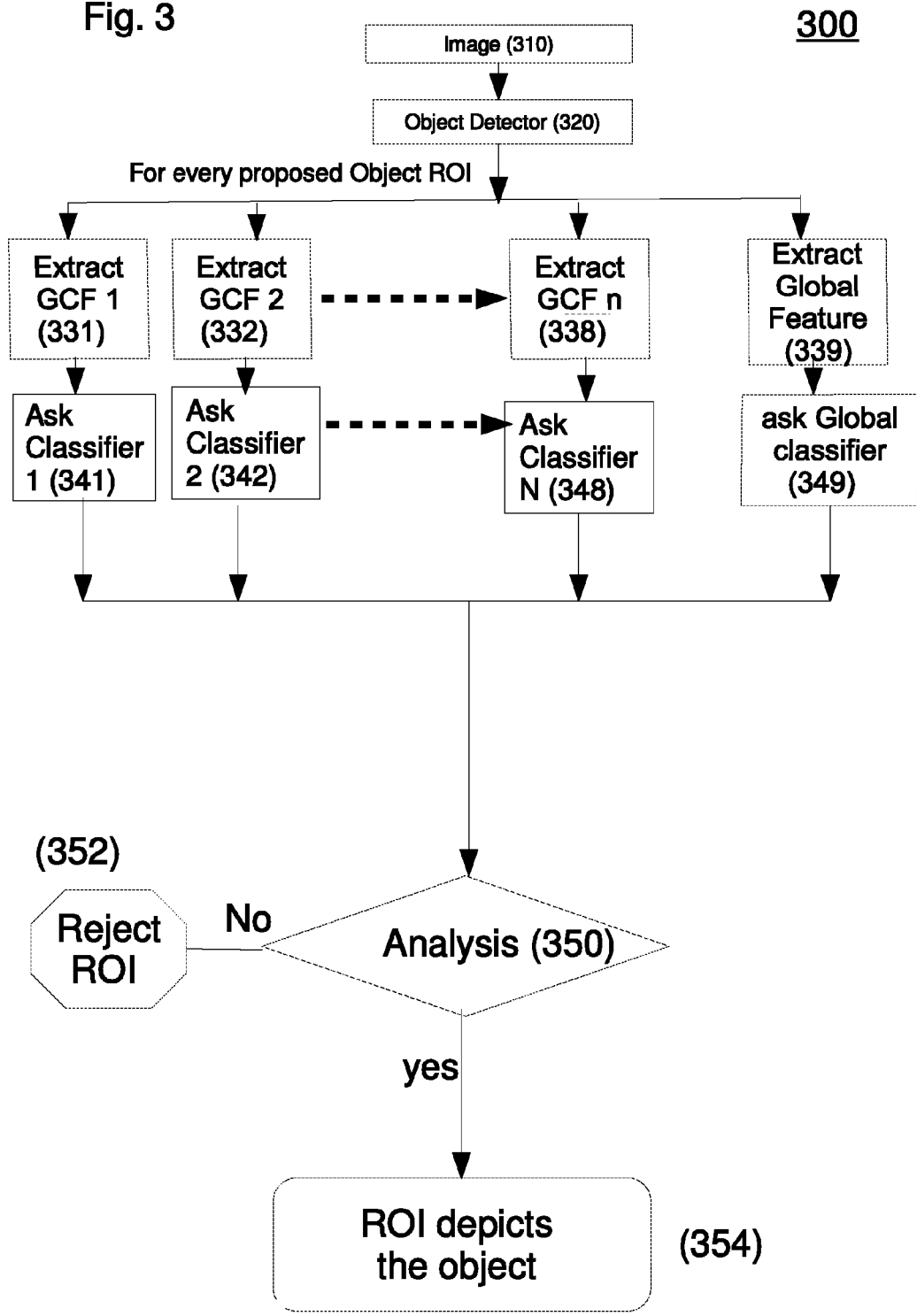
FIG. 3 is a simplified flow diagram illustrating use of classifier values (e.g. as determined in FIG. 2) to analyze a region of interest (ROI) to determine whether it actually contains the object according to some exemplary embodiments of the invention.

FIG. 3 is a simplified flow diagram depicted generally as 300 illustrating use of classifier values (e.g. as determined in FIG. 2) to analyze a region of interest (ROI) to determine whether it actually contains the object according to some exemplary embodiments of the invention.

Referring now to FIGS. 1 and 3 concurrently, a system according to some exemplary embodiments of the invention includes a network hub or port 140 adapted to detect image files 130 in transit according to their file designations and an object detector 160; 320 configured to identify one or more regions of interest (ROI) in each image file as potentially containing an object of interest (OOI). Operation of the Object Detector is depicted in FIG. 3 in the context of an individual image 310. According to various exemplary embodiments of the invention images 310 are of a type such as, for example, BMP or jPEG or gif or PNG or TIF or pmm or pgm or pbm or webp.

The system includes a feature analyzer 170; adapted to express one or more General Classification Features (GCF) 331 and/or 332 and/or 338 and/or 339 of each ROI as a vector and a decision module 180 which compares classifiers 341 and/or 342 and/or 348 and/or 349 to corresponding GCFs (331 and/or 332 and/or 338 and/or 339 respectively) and accepts/rejects (analysis 350) each ROI as containing the OOI based upon one or more GCF vectors. In some embodiments, decision module 180 calculates the sum of 2 GCFs (e.g. color moment and Gabor Function or Color Structure) and/or Global classifier 349 and compares the resultant value to classifier values stored in DB 175. In FIG. 3 item 350 performs functions described in the context of items 170 and 180 in FIG. 1.

According to various exemplary embodiments of the invention object detector 160;320 employs Boost Cascade classifier using one or more textural features such as, for example, Haar, LBP, LRD, LRP, HOG, Alternatively or additionally, according to various exemplary embodiments of the invention the GCFs include one or more of color moment, Gabor function, color histogram, skin blob geometric and color information (more complicate geometrical measures performed, and color information of the blob analyzed-preferred for post filtering of textural features), color layout, intensity edge histogram, 3 colors plane edge histogram, color structure and scalable color.

In some embodiments each GCF is expressed as a vector with a natural number value of 1 or 2 representing two class discrimination system and two probability variables between 0 and 1. Alternatively or additionally, in some embodiments a global probability vector 339 is used to combine two or more GCFs response vectors. In some embodiments, decision module 180 employs formula which summarizes two or more GCFs and/or the global response probability values to make a decision.

In some embodiments, feature analyzer 350 employs intensity edge histogram and color layout sequentially to identify objects. Alternatively or additionally, according to various exemplary embodiments of the invention the OOI are selected from the group consisting of faces and eyes.

In some embodiments, feature analyzer 350 employs intensity edge histogram, color structure and scalable color sequentially to identify breasts as objects.

Alternatively or additionally, in some embodiments object detector 160; 320 employs Skin Mask and Blob Detection to determine ROIs and geometrical information filter.

Additional Exemplary Method

Figure 4:
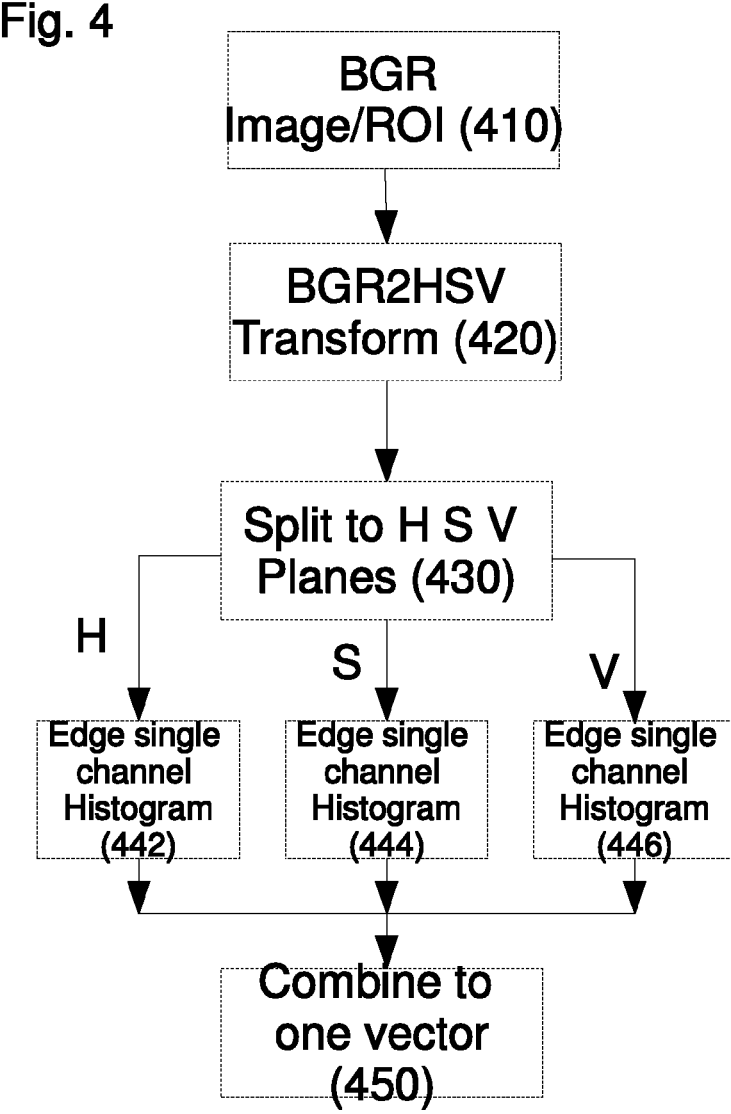
FIG. 4 is a simplified flow diagram illustrating extraction of hue (H), saturation (S) and value (V) data from BGR data according to some exemplary embodiments of the invention.

FIG. 4 is a simplified flow diagram of a method indicated generally as 400 illustrating extraction of hue (H), saturation (S) and value (V) data from BGR data according to some exemplary embodiments of the invention.

Some exemplary methods include identifying a region of interest (ROI) in a blue/green/red (BGR) image 410. (e.g. object detector 160/320 where image 130/310 is BGR encoded) and transforming 420 BGR data in the ROI to hue-saturation-value (HSV) or another separative 430 color space (e.g. HSL, XYZ, LUV, LAB); and generating edge histogram vectors from at least one of the H 442, S 444 and V 446 channels. In some embodiments, the method includes generating edge histogram vectors from at least two of the H, S and V channels. In some embodiments, the method includes generating edge histogram vectors from all three of the H, S and V channels. In some embodiments, the method includes combining 450 the edge histogram vectors from two or more channels to produce a single vector.

Exemplary Face Detection Protocol

Figure 5:
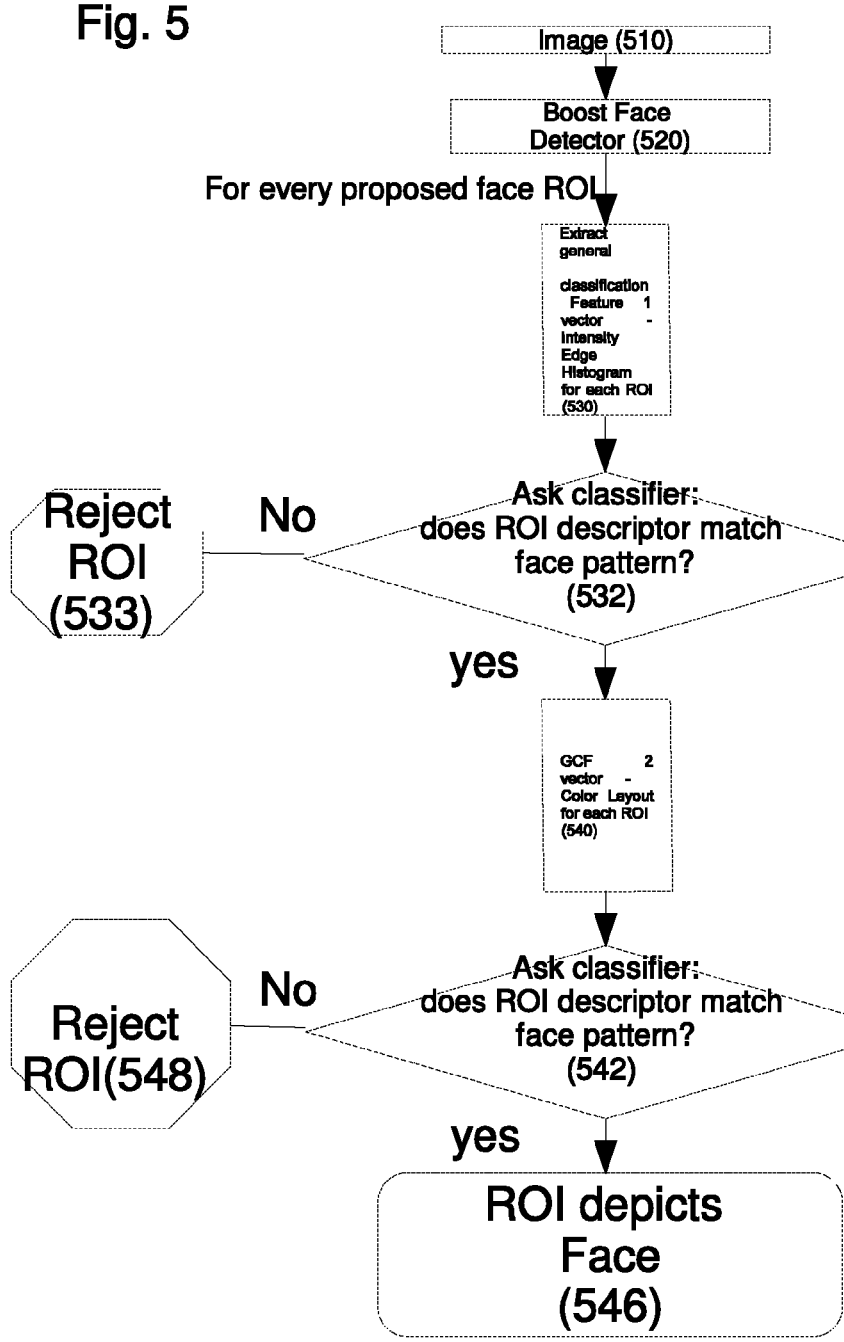
FIG. 5 is a simplified flow diagram illustrating face detection according to some exemplary embodiments of the invention.

FIG. 5 is a simplified flow diagram indicated generally as 500 illustrating face detection according to some exemplary embodiments of the invention. In the depicted exemplary embodiment, an image 510 is processed by a boost face detector 520 (analogous to 160; FIG. 1) to identify one or more ROI containing an OOI in the form of a face.

In the depicted exemplary embodiment, an analyzer applies a first GCF 530 (e.g. intensity edge histogram) to each ROI identified by detector 520 and asks 532; 180 if GCF 1 value is consistent with the classifier value for GCF 1 in DB 175 (FIG. 1). If the answer is no, the ROI is rejected 533 as not containing a face. If the answer is yes, the analyzer applies GCF 2 540 (e.g. color layout) and asks 542 if GCF 2 value is consistent with the classifier value for GCF 2 in DB 175 (FIG. 1). If the answer is no, the ROI is rejected 548 as not containing a face. If the answer is yes, the ROI is confirmed 546 as containing a face.

Additional Exemplary Face Detection Protocol

FIG. 6 is another simplified flow diagram indicated generally as 600 illustrating face detection according to some exemplary embodiments of the invention. In the depicted exemplary embodiment, an image 610 is processed by a detector 160 (FIG. 1) which sequentially applies a Bayes skin mask 620 and blob detection 630 to identify one or more ROI containing an OOI in the form of a face. If blob 630 does not match 640 a face geometric pattern, the ROI is rejected 640 as not containing a face. If blob 630 does match 640 a face geometric pattern, the ROI is subjected to analysis to determine whether it actually contains a face.

In the depicted exemplary embodiment, an analyzer applies a first GCF 650 (e.g. intensity edge histogram) to each ROI identified at 640 and asks 660 if GCF 1 value is consistent with the classifier value for GCF 1 in DB 175 (FIG. 1). If the answer is no, the ROI is rejected 662 as not containing a face. If the answer is yes, the analyzer applies GCF 2 670 (e.g. color layout) and asks 680 if GCF 2 value is consistent with the classifier value for GCF 2 in DB 175 (FIG. 1). If the answer is no, the ROI is rejected 682 as not containing a face. If the answer is yes, the analyzer applies GCF 3 690 (e.g. color moment) and asks 695 if GCF 3 value is consistent with the classifier value for GCF 3 in DB 175 (FIG. 1). If the answer is no, the ROI is rejected 696 as not containing a face. If the answer is yes, the ROI is confirmed 697 as containing a face.

Exemplary Eye Detection Protocol

FIG. 7 is a simplified flow diagram indicated generally as 700 illustrating eye detection according to some exemplary embodiments of the invention. In the depicted exemplary embodiment, an image 710 is processed by a boost eye detector 720 (analogous to 160; FIG. 1) to identify one or more ROI containing an OOI in the form of an eye.

In the depicted exemplary embodiment, an analyzer applies a first GCF 730 (e.g. intensity edge histogram) to each ROI identified by detector 720 and asks 740 if GCF 1 value is consistent with the classifier value for GCF 1 in DB 175 (FIG. 1). If the answer is no, the ROI is rejected 742 as not containing an eye. If the answer is yes, the analyzer applies GCF 2 750 (e.g. color layout) and asks 760 if GCF 2 value is consistent with the classifier value for GCF 2 in DB 175 (FIG. 1). If the answer is no, the ROI is rejected 762 as not containing a face. If the answer is yes, the ROI is confirmed 764 as containing a face.

Exemplary Content Screening Method

Referring again to FIG. 1, some exemplary embodiments of the invention are directed towards a method including detecting (e.g. by detector 160) image files 130 in a response 120 to an HTTP request 112 to identify one or more regions of interest (ROI) in each image file as potentially containing an object of interest (OOI) to be screened and analyzing (e.g. by analyzer 170) one or more General Classification Features (GCF) of each ROI and expressing the result as a vector (FIG. 3 331; 332; . . . 338) and deciding (e.g. by decision module 180) whether each ROI contains said OOI to be screened based upon said one or more GCF vectors with added latency from analyzing of less than 5 milliseconds.

As used in this specification and the accompanying claims the term "total latency" indicates a time between the beginning of the identifying and the conclusion of the deciding. According to various exemplary embodiments of the invention detector dependent latency (e.g. at 320; 520; 620+630+ 640; 720; 820) is typically between 40 milliseconds and 2000 milliseconds.

According to various exemplary embodiments of the invention the additional latency from the analyzing step(s) (e.g. at 350; 532+542; 660+680+695; 740+760; 840+860+ 880) is 0.5 milliseconds to 5 milliseconds. Thus, practice of various screening methods which embody the invention can increase accuracy significant with an added latency of 1-2% of detector dependent latency.

In some embodiments, the OOI to be screened is naked breast.

FIG. 8 is a simplified flow diagram indicated generally as 800 illustrating breast detection according to some exemplary embodiments of the invention. Incorporation of this exemplary flow into the method described above is one way to screen breasts from modified responses 122 (FIG. 1). In method 800 an image 810 is screened by an identification system including a Boost Breast detector 820. Each ROI is analyzed (analyzer 170; FIG. 1). In the depicted exemplary embodiment, the analysis includes sequential determination of intensity edge histogram 830, color structure 850 and scalable color 870 sequentially to identify breasts as objects. Initially intensity edge histogram 830 is determined and compared 840 (e.g. to data in DB 175 FIG. 1) to either reject 842 or tentatively accept the ROI as containing a breast. If the ROI is tentatively accepted, color structure 850 is determined and compared 860 (e.g. to data in DB 175 FIG. 1) to either reject 862 or tentatively accept the ROI as containing a breast. If the ROI is tentatively accepted, scalable color 870 is determined and compared 880 (e.g. to data in DB 175 FIG. 1) to either reject 882 finally conclude 884 the ROI as containing a breast.

Exemplary Screening Possibilities

Referring again to FIG. 1, once a determination has been made that a specific image file 130 contains a ROI containing an OOI several screening procedures are feasible.

In some embodiments, an opaque mask is applied to cover any ROI in image 130 containing the OOI to be screened and the masked version of the image is included in modified response 122 to HTTP request 112.

In some embodiments, any image 130 with an ROI actually containing the OOI to be screened is deleted modified response 122 to HTTP request 112.

In some embodiments, any image 130 with an ROI actually containing the OOI to be screened causes blocking of transmission of response 122. In some embodiments, a message that request 112 was denied in its entirety is provided in lieu of response 122.

Exemplary Use Scenarios

Systems and methods described hereinabove are expected to find utility in filtering of unwanted content and/or time and attendance control systems and/or animation of faces (or other objects) in the entertainment industry and/or visual search engines and/or automatic cataloging of images (e.g. for an archive or museum).

Exemplary Advantages

As an illustrative example, an evaluation set consisting of 240 face images from IMM face dataset, 1000 images without face from Oxford-Caltech house dataset, 1000 images without face from Oxford-Caltech—airplane dataset was analyzed using a method as described hereinabove.

TP: from 239 TP ROIS 229 were retained. This represents a TP retention rate of greater than 95.8%.

The original recall was 99.58% and the new recall was 95.4%.

FP: from 120 FP ROIS only 7 were retained. This represents a FP retention rate of only 5.8%.

original FP rate=120/(239+120)=33.42% new FP rate=7/(7+229)=2.96%.

Expressed as precision, the results were

Original precision of the detector was 66.57% and precision after analysis according to an exemplary method of the invention was 97%.

Detector latency was 42.1 ms/image and total latency including analysis according to an exemplary embodiment of the invention was 42.83 milliseconds/image. The increase in latency from the analysis portion of the Exemplary method according to the invention was 1.7% compared to a much TP retention rate, lower FP retention rate and increased precision.

It is expected that during the life of this patent many new image analysis algorithms will be developed and the scope of the invention is intended to include all such new technologies a priori.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module or process is an explicit statement that additional embodiments of the invention not including the recited feature, part, component, module or process exist.

Specifically, the invention has been described in the context of screening of interne content but might also be used to catalog image files (e.tg. by generation of meta-tags)

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

The invention claimed is:

1. A system comprising:
    (a) a network hub or port adapted to detect image files in transit according to their file designations;
    (b) an object detector configured to identify one or more regions of interest (ROI) in each image file as potentially containing an object of interest (OOI);
    (c) a feature analyzer adapted to express one or more General Classification Features (GCF) of each ROI as a vector; and
    (d) a decision module adapted accept or reject each ROI as containing said OOI based upon said one or more GCF vectors, wherein said GCFs include one or more of Gabor function, skin blob geometric and color information, intensity edge histogram, 3 colors plane edge histogram, color information such as color histogram, color layout, color moment, color structure and scalable color.

2. A system according to claim 1, wherein said object detector employs one or more Boosted Classifier algorithms (e.g. WaldBoost, LogitBoost, AdaBoost-Gentle AdaBoost, Discrete AdaBoost and Real AdaBoost) with at least one textural feature selected from the group consisting of Haar, LBP, LRD, LRP, HOG.

3. A system according to claim 1, wherein each GCF is expressed as a vector with a natural number value of 1 or 2 representing two class discrimination system and two probability variables between 0 and 1.

4. A system according to claim 1, wherein a global probability vector is used to combine two or more GCFs response vectors.

5. A system according to claim 1, wherein said feature analyzer employs intensity edge histogram and color layout sequentially to identify objects.

6. A system according to claim 5, wherein said objects are selected from the group consisting of faces and eyes.

7. A system according to claim 1, wherein said feature analyzer employs intensity edge histogram, color structure and scalable color sequentially to identify breasts as objects.

8. A system according to claim 1, wherein said object detector employs Skin Mask and Blob Detection to determine ROIs and geometrical information filter.

9. A system according to claim 8, wherein said feature analyzer employs intensity edge histogram, Color Layout and Color Moment sequentially to identify faces as objects.

10. A system comprising:
(a) a network hub or port adapted to detect image files in transit according to their file designations;
(b) an object detector configured to identify one or more regions of interest (ROI) in each image file as potentially containing an object of interest (OOI);
(c) a feature analyzer adapted to express one or more General Classification Features (GCF) of each ROI as a vector; and
(d) a decision module adapted accept or reject each ROI as containing said OOI based upon said one or more GCF vectors, wherein a formula is used to summarize two or more GCFs and/or the global probability vector.

11. A system according to claim 10, wherein a global probability vector is used to combine two or more GCFs response vectors.

* * * * *